May 2, 1961 — M. A. MEYER — 2,982,956
RADAR SYSTEM
Original Filed Sept. 10, 1956 — 3 Sheets-Sheet 1

INVENTOR
MAURICE A. MEYER
BY Joseph Weingarten
ATTORNEY

May 2, 1961 M. A. MEYER 2,982,956
RADAR SYSTEM
Original Filed Sept. 10, 1956 3 Sheets-Sheet 2

INVENTOR
MAURICE A. MEYER

BY Joseph Weingarten
ATTORNEY

United States Patent Office 2,982,956
Patented May 2, 1961

2,982,956
RADAR SYSTEM

Maurice A. Meyer, Natick, Mass., assignor to Laboratory for Electronics, Inc., Boston, Mass., a corporation of Delaware
Original application Sept. 10, 1956, Ser. No. 610,444. Divided and this application Sept. 10, 1956, Ser. No. 610,443

17 Claims. (Cl. 343—8)

The present invention relates in general to pulsed radar systems and in particular to a pulsed Doppler radar system having a pulse repetition frequency which is controlled by an altimeter. Utilization of the inventive concepts in an airborne Doppler radar system results in attaining an exceptionally high degree of system sensitivity at all altitudes. The present application is a division of the co-pending application of Maurice A. Meyer, entitled Doppler Radar System, Serial No. 610,444, filed September 10, 1956.

In prior art pulsed radar systems of the Doppler and conventional type, it has been the practice to employ a relatively short duty cycle for the transmitter; that is, the transmitter is on for a much shorter time than it is off. In such systems, when the transmitter is off, the receiver is on and can respond to that portion of the radiated energy which is returned. However, since the time interval during which reflected energy is being received is limited to the duration in which energy is being returned from scatterers of the transmitted pulse, there remains a relatively large period during which the receiver is operative but no energy is applied thereto. Accordingly, the receiver may respond to noise, thereby reducing overall system sensitivity.

The low duty cycle of the transmitter is especially disadvantageous in connection with Doppler radar systems, for there may be a large time interval during which the receiver is open but no useful signal is received. Moreover, if a selected system sensitivity is required, then a pulse of high frequency energy radiated by a low duty cycle system must have a relatively high peak power. The generation of pulses of high peak power requires bulky components, such as a magnetron and dissipation of relatively large amounts of power. The larger power supply required adds to the bulk and weight of the overall system.

As indicated in the aforesaid co-pending application, the present system utilizes coherent fixed frequency signals whereas the prior art systems were of the non-coherent type wherein depressed beams are oriented forward and rearward, with a pulsed magnetron generating the microwave energy for radiation. Because no coherent local oscillator signal was there available, it was necessary to determine the Doppler frequency shift by mixing the signal returns from the forward and rearward beams to derive a signal with audio frequency components. If the forward beam were radiating upon a hill while the rearward beam were radiating into a valley, the signal return from the former would arrive before that from the latter. If the beams were pencil beams, then there would not be an interval in which simultaneous returns from both beams were available and no Doppler frequency shift would be detected for the previously radiated pulse. To avoid this difficulty, the prior art systems radiated beams having a wide dimension substantially along a hyperbola of constant Doppler frequency shift. Thus, energy returned from the earth during a time interval much greater than the duration of the transmitted pulse. This arrangement dictates a requirement for an increase in the radiated power to atttain a given system sensitivity.

The coherent arrangement of the present system enables frequency shifts present in the signal return from each beam to be independently detected. Furthermore, pencil beams are radiated to effect an increase in system sensitivity for a given radiated power, since the use of pencil beams enables the receiver to be open during time intervals substantially equal to the duration of the transmitted pulse.

There is another disadvantage inherent in prior art airborne Doppler radar systems with respect to the pulse repetition frequency. Heretofore, it has been the practice to select a pulse repetition frequency which does not exceed twice the Doppler frequency shift corresponding to the highest expected velocity in order to avoid the undesirable effects of spectrum foldover described in the above-mentioned co-pending application.

Another undesirable effect results from the finite time required for the energy to travel from the aircraft to the earth and be reflected back again. At higher altitudes, a longer time is consumed. If too high a pulse repetition frequency is chosen, then at some altitudes a reflected pulse will be received which overlaps the next transmitted pulse, and the receiver will not be able to respond to all the reflected energy. In fact, at an altitude where the reflected and next radiated pulse completely overlap, utilization of the reflected pulse would be seriously hampered.

This difficulty is alleviated somewhat in prior art systems by frequency modulating the pulse repetition frequency. However, at high altitudes the dimension of the cross-section of prior art radiated beams, along a hyperbola of constant Doppler frequency shift at the surface of the earth, is so great that energy is returned from each transmitted pulse for an interval which exceeds the period between radiated pulses. Consequently, the return signals from consecutively transmitted pulses overlap. Since they are non-coherent, the overlapping signals combine randomly and appear as noise to the receiver, thereby reducing system sensitivity.

Accordingly, it is a primary object of the present invention to provide a pulsed radar system which transmits a pulse of the optimum duration for achieving maximum system sensitivity with a given radiated power.

Another object of the invention is the provision of a pulsed radar system having a high degree of sensitivity, and yet utilizing relatively lightweight transmitter components which consume a relatively small amount of power.

A further object of the invention is the provision of a pulsed airborne Doppler radar system of high sensitivity, yet compact and lightweight and arranged to operate at maximum sensitivity within selected altitude ranges.

Still another object of the invention is the provision of a pulsed Doppler radar system in accordance with the above objects which is capable of responding and utilizing returned Doppler frequency-shifted signals even when substantially at ground level.

In a broad form, there is provided according to the invention a radar system having means for radiating bursts of microwave energy during first time intervals and receiving means capable of responding to that portion of the microwave energy which is reflected. The receiver is rendered sensitive to the reflected energy only when microwave energy is not being radiated during second time intervals. The first and second time intervals alternate and are of substantially equal duration. In another aspect of the invention, means sensitive to the distance between the radiating means and the reflecting surface are provided for controlling the repetition frequency of the radiated high frequency bursts or pulses in accordance with the distance sensed, the closer the reflecting surface, the higher the pulse repetition frequency.

In a particular form which the invention takes in a pulsed airborne Doppler radar system wherein the reflected energy returns from the surface of the earth, the distance sensitive means is an altimeter which effects stepwise changes in the pulse repetition frequency as altitude changes at selected levels are sensed. Preferably, this pulse repetition frequency is selected to be a sub-harmonic of a fixed frequency signal utilized elsewhere in the receiving system, thereby preventing unwanted low frequency signals, which might interfere with the received Doppler frequency shifts, from being introduced into the receiving system.

Other features, objects and advantages of the invention will become apparent from the following specification when read in connection with the accompanying drawing in which.

Figure 1:
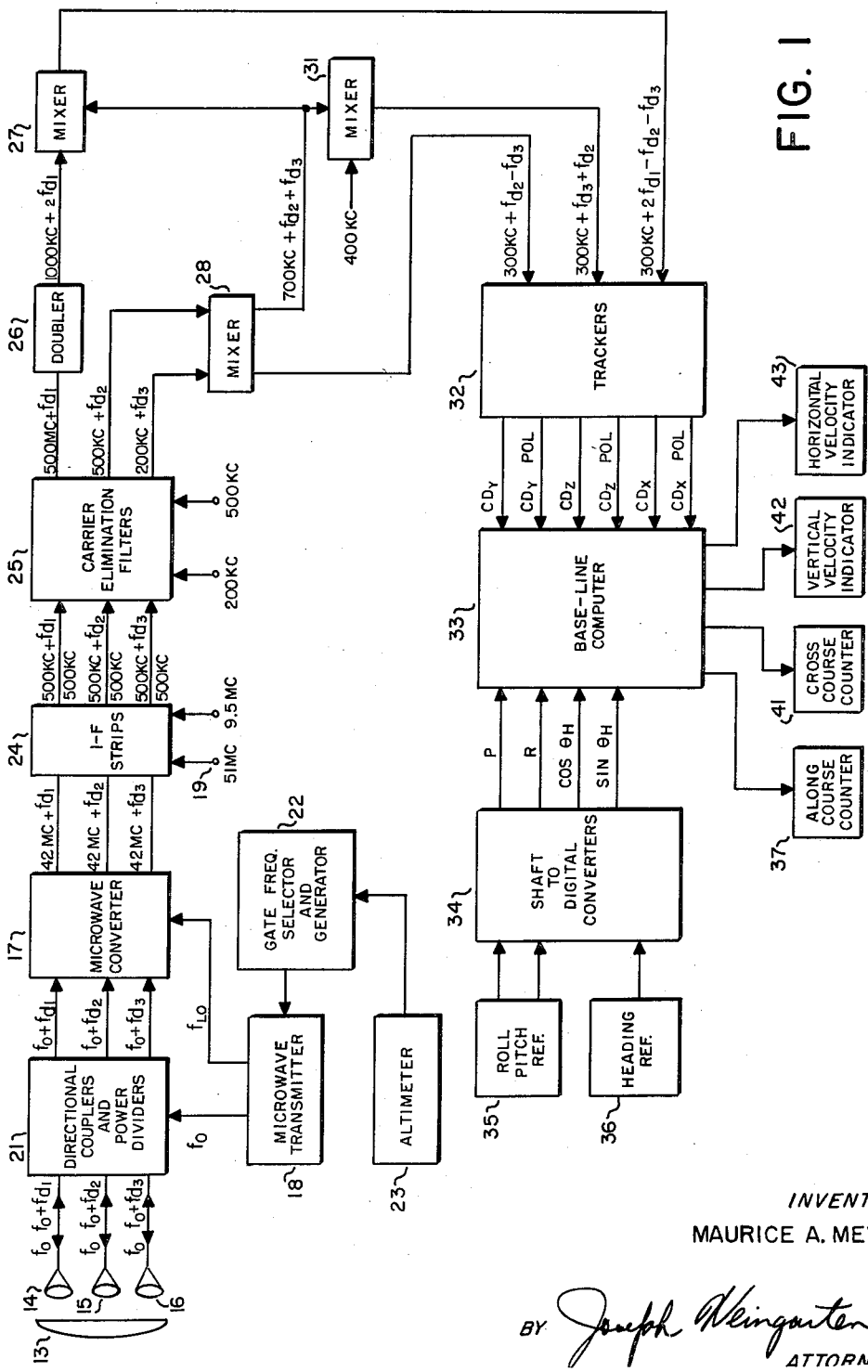
Fig. 1 is a block diagram of a representative embodiment of an airborne Doppler radar navigational system.

With reference now to the drawing and more particularly Fig. 1 thereof, a microwave lens 13 is energized by radiated energy from conical horns 14, 15 and 16, the latter horns being coupled to microwave converter 17 and microwave transmitter 18 by the directional couplers and power dividers 21. Transmitter 18 generates a transmitted signal of frequency $f_0$ and local oscillator signal of frequency $f_{LO}$ during alternate mutually exclusive intervals in response to gating pulses from gate generator 22, the frequency of this signal being controlled by altimeter 23. Converters 17, energized by the local oscillator signal, provides output signals for application to I.-F. strips 24 which are also energized by a pair of fixed frequency signals to provide an output signal to carrier elimination filters 25, displaced in the frequency spectrum from the input signal, but retaining the Doppler frequency shifts. The latter filters are also energized by fixed frequency signals that are utilized as carrier signals upon which the Doppler frequency shifted signals are modulated. One output from filters 25 is applied to a frequency doubler 26 whose output is applied to a mixer 27. The other two output signals from filters 25 are applied to mixer 28 to provide sum and difference frequency signals, the sum signal being applied to mixers 27 and 31 while the difference frequency signal is directly applied to one channel of the trackers 32. The other input to mixer 31 is a fixed frequency signal to effect an output from the latter mixer which includes the desired Doppler frequency shifted signals disposed about a carrier signal, enabling the trackers to respond to the Doppler frequency shifts. The mixer 31 output signal is applied as a second signal input to trackers 32. The third signal for application to the tracker is derived from the output of mixer 27.

The output of the trackers includes signals whose frequency shifts are proportional to the three generalized Doppler variables $D_x$, $D_y$ and $D_z$ discussed in detail in the aforesaid parent application, together with a polarity indication for each variable to indicate the sense of the associated Doppler shift. The signals are applied to the base line computer 33 which also receives signals from shaft-to-digital converters 34, indicative of pitch angle, roll angle, and the sine and cosine of the aircraft azimuthal heading angle. The shaft-to-digital converters 34 couple to the computer in digital form, the analog information derived from roll and pitch reference 35 and heading reference 36. The output of base line computer 33 energizes an along course counter 37, which indicates the distance traveled along the course from the starting point or other reference point, a cross course counter 41 which indicates the magnitude and direction of deviation across the selected course line, and vertical and horizontal velocity indicators 42 and 43 respectively which indicate magnitude and direction of aircraft velocity in elevation and azimuth respectively.

Having discussed the system arrangement, its mode of operation will be described. When gate generator 22 renders microwave transmitter 18 operative for the generation of a microwave signal of frequency $f_0$, the latter signal is coupled through power dividers and directional couplers 21 to each conical horn 14, 15 and 16 which respectively radiate beams through lens 13 which are focused into pencil beams by the lens.

Energy returned from the three beams is focused by the lens upon the respective horns from which the energy emanated. The directional couplers 21 direct the returned energy, which includes the transmitted frequency $f_0$ plus the Doppler frequency shifts $f_{d_1}$, $f_{d_2}$, $f_{d_3}$ from the beams respectively associated with horns 14, 15 and 16 to microwave converter 17. In microwave converter 17, the three received signals are mixed with a local oscillator signal to provide the signals with the Doppler frequency shifts, transposed in frequency about a 42 mc. I.-F. frequency as indicated, for amplification by respective channels in I.-F. strips 24. Fixed frequency signals of 51 mc. and 9.5 mc. are also applied to the latter strips and the difference frequency signal is mixed with the 42 mc. signal to provide outputs which include the Doppler frequency shifts about 500 kc.

As indicated above, a pulsed system is normally arranged so that the receiver is off when the transmitter is on. Thus, the 500 kc. carrier signal is usually not present. The exception occurs at very low altitudes when the pulse repetition frequency is at its highest value. Since energy from transmitted pulses returns almost instantaneously, the receiver is deliberately rendered operational during a portion of the interval in which a pulse is transmitted. During this interval, 500 kc. carrier signal is present in the I.-F. strips output signal. However, the proximity of the aircraft to the ground results in a signal return of sufficient strength to overcome the effects of carrier leakage after selective filtering by carrier elimination filters 42.

The signals from I.-F. strips 24 are applied to the carrier elimination filters 25. Each filter is preferably of the type described in the co-pending application of M. A. Meyer, entitled "Selective Circuit," Serial No. 329,803, filed January 6, 1953, and are as illustrated in Fig. 1 thereof with respect to filters having $f_{d_1}$ and $f_{d_2}$ in the outputs. However, since it is desired that the signal output having the $f_{d_3}$ Doppler component be relatively close to 200 kc., the single side band modulator 25 in Fig. 1 of the aforesaid application is energized by quadrature components of a 200 kc. fixed frequency signal instead of the reference signal quadrature components as indicated therein.

The signal component containing $f_{d_1}$ is applied to doubler 26 to provide an output signal having a frequency component of 1000 kc. $+2f_{d_1}$. The other two output signals from the carrier elimination filters, having components including $f_{d_2}$ and $f_{d_3}$ about 500 and 200 kc. respectively, are applied to mixer 28 to provide a difference frequency signal of 300 kc. $+f_{d_2}-f_{d_3}$ which is applied to one input of the trackers 32. The sum signal from mixer 28, having 700 kc. $+f_{d_2}+f_{d_3}$ is applied to mixer 27, and the difference frequency output therefrom, 300 kc. $+2f_{d_1}-f_{d_2}-f_{d_3}$, applied to another input of the trackers 32. The sum signal from mixer 28 is also applied to mixer 31, which has a second input energized by a 400 kc. fixed frequency signal. The difference frequency signal therefrom is applied as the remaining input signal to the trackers 32.

Figure 2:
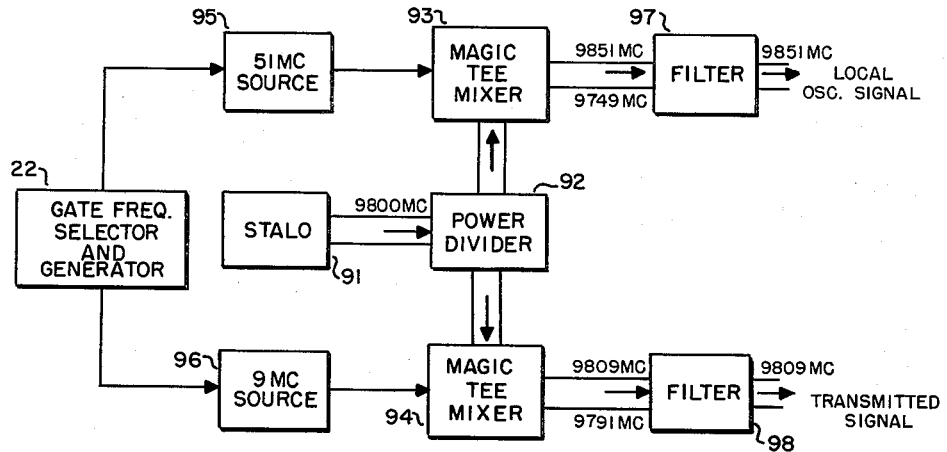
Fig. 2 is a block diagram of a preferred embodiment of the microwave transmitter of Fig. 1.

With reference to Fig. 2, a preferred form of microwave transmitter 18 of Fig. 1 is depicted in block diagram form. While conventional microwave signal sources may be used to generate the radiated and local oscillator signals, the preferred embodiment of microwave transmitter 18 has features which are especially advantageous in connection with Doppler navigational systems. These advantages will be better understood after the discussion of the arrangement of the transmitter and its mode of operation. Microwave transmitter 18 is seen to comprise a stable local oscillator 91 which energizes magic tee mixers 93 and 94 through a power divider 92. Mixers 93 and 94 are also energized by 51 mc. and 9 mc. sources 95 and 96 respectively. The latter signal sources emit signals during alternating mutually exclusive time intervals in accordance with a gating signal from gate frequency selector and generator 22. The outputs of mixers 93 and 94 are applied to filters 97 and 98 respectively, the output signals from the latter filters being applied to microwave converter 17 and directional couplers and power dividers 21 respectively of Fig. 1. Stalo 91 is a stable microwave oscillator preferably of the type wherein a servo control system, which includes a discriminator cavity, maintains the oscillator frequency at substantially the center frequency of the cavity. Other stable oscillators, such as the type employing a relatively low frequency crystal oscillator energizing a chain of frequency multipliers may also serve as the stable local oscillator.

In this example, the output signal from the stable local oscillator is a 9800 mc. microwave signal and is applied through microwave coupling means to power divider 92 which channels portions of the input power through microwave coupling means to magic tee mixers 93 and 94. Although other mixing means may be employed, each mixer is preferably of the type employing semiconductor diodes in a magic tee arrangement which precludes energy from being coupled back to power divider 92. When source 95 responds to the gating signal from gate generator 22 with a 51 mc. output signal, mixer 93 is also energized by the latter to provide an output signal which includes sum and difference frequency signals of 9851 mc. and 9749 mc. respectively. A filter 97 rejects all but the 9851 mc. signal and the latter serves as the local oscillator signal for application to a power divider 21 in Fig. 1. When the signal from gate generator 22 maintains source 95 in the inactive state, the only output from mixer 93 is a 9800 mc. signal which is rejected by filter 97; hence, there is no local oscillator signal and microwave converter 17 (Fig. 1) is effectively inoperative. Accordingly, receiving apparatus, which includes converters 17 and I.-F. strips 24, is then insensitive to received signals. To more completely desensitize the receiving apparatus during the transmitting interval, the 51 mc. source 95 is coupled to terminal 19 of the I.-F. strips 24 in Fig. 1, there normally being no 51 mc. signal then applied to terminal 19 during the interval a pulse is transmitted. A further result is a reduction of noise to signal ration of substantially 3 db because thermal noise at the input circuits of the I.-F. strip is eliminated during these intervals.

When the signal from gate generator 22 activates source 96, mixer 94 is also energized by a 9 mc. signal to provide a signal output which includes sum and difference frequency signals of 9809 mc. and 9791 mc. respectively. Filter 98 rejects substantially all but the 9809 mc. signal to provide a transmitted signal of 9809 mc. at the output which is applied to a power divider 21 in Fig. 1. When the gating signal from generator 22 disables signal source 96, the only output signal from mixer 94 is a 9800 signal which is rejected by filter 98. No signal is transmitted during this interval.

It is seen that this novel arrangement provides the desired alternate operation of transmitter and receiver at microwave frequencies by controlling the emission of relatively low frequency signals. Stalo 91 continues to emit at all times; hence, no stability problems are presented with respect to the primary microwave signal frequency source. It is relatively easy to gate the 51 mc. and 9 mc. sources without affecting the frequency stability of their output signal. Thus, two stable microwave signals are supplied whose frequency difference is the desired high frequency of the receiver I.-F. strips. Since both signals are derived from Stalo 91 any drift in the output frequency of the latter causes no change in the difference frequency signal. The stability of the latter is dependent only on the stability of the 9 and 51 mc. signal sources, which frequencies may be controlled within tight tolerances by utilizing well-known crystal oscillator techniques.

As indicated above, the preferred system includes a time-shared transmitter-receiver; that is, when the transmitter is on the receiver is off and vice versa. This type of operation effects increased system sensitivity. With C.-W. Doppler systems the return signal must be high enough to override carrier leakage signals from the transmitter, but with the system described herein the receiver is operative during intervals when no carrier signal is radiated; hence, substantially all the gain of the receiver may be utilized for responding to the reflected signal. The particular embodiment preferred for effecting this duplexer type of arrangement utilizes a stable microwave signal source which continually generates a primary microwave signal whose frequency is different from that of the transmitted signal, thus enabling the latter source to remain on at all times, the receiver being insensitive to its output frequency, even though portions might leak to the receiver.

As indicated above, another feature of the present system is the utilization of coherent fixed frequency signals. The signals of frequency 200 kc., 500 kc., 700 kc., 9 mc., 9.5 mc. and 51 mc. are all generated from the same basic timing oscillator source by utilizing a combination of harmonic generators and mixers of the type well known in the art. Since both the local oscillator and transmitted signals are derivved by combining the same stable microwave signal with one of the coherently generated signals, the transmitted signal and all signals in the receiving system are coherent; hence, despite the frequency translation of the returned Doppler frequency-shifted spectra within the receiving system, precise retention of the Doppler frequency shifts relative to an appropriate reference frequency is readily obtained.

With the coherent arrangement of the present system, frequency shifts present in the signal return from each beam can be indpendently detected. As a result, pencil beams may be radiated to effect an increase in system sensitivity for a given radiated power. A further advantage is that the Doppler frequency-shifted spectra may be tracked at relatively high frequencies, eliminating the problems encountered in connection with spectrum foldover described in the parent application.

A feature of the present system is the utilization of a 50% duty cycle; that is, the duration of each radiated pulse is substantially equal to the time interval between pulses. Accordingly, reflected energy is returned to the receiver for a longer period of time as compared with prior art low duty cycle pulsed radar systems where the interval between radiated pulses greatly exceeds the pulse duration. Furthermore, by controlling the pulse repetition rate in accordance with the aircraft altitude so that as the transmitted pulse ends, the reflected energy from the leading edge thereof returns to the aircraft, the receiver may operate at maximum sensitivity while responding to substantially the entire reflected pulse.

Another advantage of the 50% duty cycle of the present invention is the nature of the frequency spectrum thereby radiated. Most of the energy is in sidebands relatively close to the carrier frequency. Accordingly, even the prior art systems, which track at relatively low frequencies, would be supplied with more low frequency energy in the signal return if a high duty cycle were employed, thereby increasing system sensitivity. The relatively narrow radiated pulses of the prior art systems have a spectral distribution wherein a substantial portion of the radiated energy is in the higher order sidebands, which is all discarded by the low pass filter arrangement used therein to alleviate the ambiguity problem discussed in the aforesaid copending application in connection with spectrum foldover.

Figure 3:
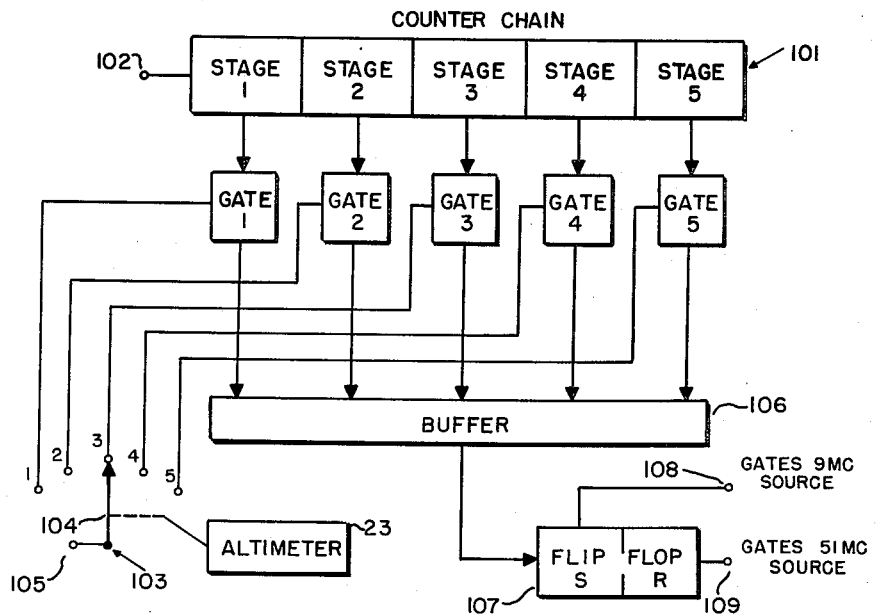
Fig. 3 is a block diagram of the novel altimeter controlled gate frequency selector and generator.
Figure 4:
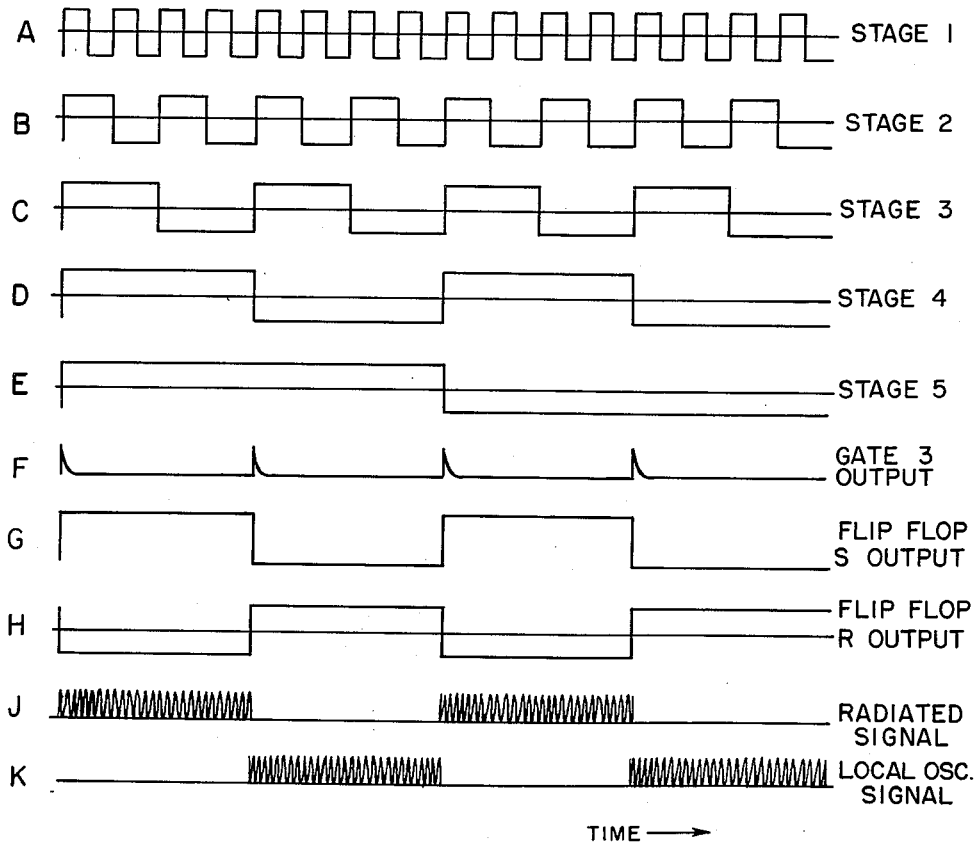
Fig. 4 is a graphical representation of signal waveforms plotted as a function of time and pertinent to the understanding of the apparatus illustrated in Figs. 2 and 3.

Operation of the aforesaid system will be better understood from the following discussion of the system block diagram in Fig. 3, and the signal waveforms graphically represented as functions of time in Fig. 4. With reference to Fig. 3, there is illustrated in block diagram form, gate frequency selector and generator 22 of Figs. 1 and 2 arranged to cooperate with altimeter 23 of Fig. 1. A counter chain 101 is energized on terminal 102 by the 500 kc. signal utilized elsewhere in the system illustrated in Fig. 1. The output of each counter stage is coupled to a gate whose other input is connected to a terminal on switch 103, each terminal and gate bearing a number which corresponds to the associated counter stage. The arm of switch 104 is coupled to a source of positive potential at terminal 105 and actuated by the shaft of altimeter 23. The outputs of the gates are coupled to buffer 106 which in turn energizes flip-flop 107. The S output of flip-flop 107 at terminal 108 is coupled to the 51 megacycle source 95 in Fig. 11, while the R output thereof on terminal 109 is coupled to the 9 megacycle source 96.

Referring to the signal waveforms of Fig. 4, the mode of operation of the system of Fig. 3 will be described. Counter stage 101 is energized at stage 1 by the 500 kc. signal utilized elsewhere in the system. Stage 1 responds to this input signal with a plate signal waveform illustrated in Fig. 4A. The remaining stages respond to the signals from the preceding stage to provide plate signal waveforms illustrated in Figs. 4B, 4C, 4D and 4E. Each of these plate waveforms is differentiated and applied to an associated gate. The arm of switch 104 is actuated by movement of the shaft of altimeter 23, the system being arranged so that arm 104 connects terminal 105 to switch position 1 when the altimeter indicates 0–2000 feet, to switch terminal 2 when 2000–4000 feet is indicated, to switch terminal 3 when 4000–8000 feet is indicated, to switch terminal 4 when 8000–16,000 feet is indicated, and to switch terminal 5 when readings above 16,000 feet are indicated. When a switch terminal is connected to terminal 105, a corresponding gate is activated and output pulses therefrom are coupled to buffer 106 which in turn couples pulses to flip flop 107. For example, with arm 104 connected to switch terminal 3 as illustrated, the gate 3 output pulses illustrated in Fig. 4F are coupled through buffer 106 to flip flop 107, the latter responding by providing as an output signal on terminals 108 and 109 the plate waveforms from the S and R sections respectively illustrated in Figs. 4G and 4H. The latter two waveforms are of opposite phase and are respectively applied to the 9 mc. source 96 and the 51 mc. source 95 to control their respective outputs. In response to the two gating signals from flip flop 107, the output signals from filters 98 and 97 of Fig. 2 are as illustrated in Figs. 4J and 4K respectively. Thus, bursts of a signal for radiation and local oscillator signal are generated for equal durations, but during mutually exclusive alternating time intervals.

The reason for varying the pulse repetition rate in steps is to avoid unwanted modulation products in the received signal. As indicated in Fig. 1, the input signals to the carrier elimination filters 25 includes a 500 kc. component. Since the generated microwave signals are pulsed at a sub-harmonic of 500 kc., the received signal also contains a 500 kc. harmonic of the pulse repetition frequency. However, since the gating signal is derived from the same 500 kc. source which energizes the rest of the system, the harmonics at 500 kc. are in phase with other 500 kc. signals present and introduce no additional frequency-shifted components which might erroneously be detected as Doppler shifts. It has been discovered that utilization of the indicated technique of halving the pulse repetition rate when the indicated altitude is doubled results in adequate system sensitivity.

Although this gating system has been described in connection with a conventional electron tube flip flop counter chain and a vacuum tube flip flop 107, the novel concepts may be embodied utilizing other bistable circuits such as transistor and/or magnetic core circuits which perform similar functions and altimeter information may be supplied from any suitable altitude indicating device.

At low altitudes where the transmitted and returned signals overlap and it is desired to render the receiver operative during the intervals in which a pulse is transmitted, means may be provided for coupling a source of positive gating potential to the 51 mc. source 95 continuously instead of the signal waveform on output terminal 109. The latter means may be manually operated or responsive to an altimeter indication less than a predetermined value.

In connection with the foregoing description of a preferred embodiment of the invention, specific frequencies and component arrangements have been described by way of example only. Those skilled in the art make numerous modifications of and departures from the specific apparatus described herein without departing from the disclosed inventive concepts. Consequently, the invention is to be construed as limited only by the spirit and scope of the appended claims.

What is claimed is:

1. A pulsed airborne Doppler radar system comprising, transmitting means capable of earthward radiation of high frequency energy, receiving means capable of responding to said radiated high frequency energy which is returned from the surface of the earth, said receiving means utilizing a fixed frequency signal from a source thereof, a source of a gating signal of frequency which is a selected subharmonic of said fixed frequency, means responsive to said gating signal for activating said transmitting and receiving means respectively during alternating substantially equal time intervals, and means responsive to stepwise system altitude changes for determining the subharmonic selected.

2. A pulsed Doppler radar system comprising, sources of coherently generated transmitted, local oscillator and gating signals, an antenna system responsive to an input signal for radiating a plurality of pencil beams and separately receiving energy returned from the respective radiated beams, associated with each beam a mixer with first and second inputs, means for coupling the returned energy from each beam to a respective second input, and means responsive to said gating signal for applying said transmitted signal as an input signal to said antenna system and said local oscillator signal to the first input of each mixer during alternating mutually exclusive time intervals.

3. The apparatus of claim 2 wherein said alternating mutually exclusive time intervals are of substantially equal duration.

4. A pulsed Doppler radar system comprising, a source of coherently generated transmitted and local oscillator signals, an antenna system responsive to an input signal for radiating a plurality of pencil beams and separately receiving energy returned from the respective beams, associated with each beam a mixer with first and second inputs, means for coupling the returned energy from each beam to a respective second input, a source of a gating signal, and means responsive to said gating signal for applying said transmitted signal as an input signal to said antenna system and said local oscillator signal to the first input of each mixer during alternating mutually exclusive time intervals.

5. The apparatus of claim 4 wherein said mutually exclusive time intervals are of substantially equal duration.

6. A pulsed Doppler airborne radar system comprising, sources of coherently generated transmitted, local oscillator and gating signals, an antenna system responsive to an input signal for radiating a plurality of pencil beams and separately receiving energy returned from the respective radiated beams, associated with each beam a mixer with first and second inputs, means for coupling the returned energy from each beam to a respective second input, means responsive to said gating signal for applying said transmitted signal as an input signal to said antenna system and said local oscillator signal to the first input of each mixer during alternating mutually exclusive substantially equal time intervals, altitude sensitive apparatus, and means responsive to the altitude indication of said altitude sensitive apparatus for controlling the frequency of said gating signal.

7. A pulsed Doppler airborne radar system comprising, sources of coherently generated transmitted, local oscillator and gating signals, an antenna system responsive to an input signal for radiating a plurality of pencil beams and separately receiving energy returned from the respective radiated beams, associated with each beam a mixer with first and second inputs, means for coupling the returned energy from each beam to a respective second input, means responsive to said gating signal for applying said transmitted signal as an input signal to said antenna system and said local oscillator signal to the first input of each mixer during alternating mutually exclusive substantially equal time intervals, an altimeter, and means responsive to changes in the altitude indicated by said altimeter at selected altitudes for changing the frequency of said gating signal by an integral factor.

8. The apparatus of claim 7 wherein said integral factor is two.

9. A pulsed airborne Doppler radar system comprising, transmitting means capable of earthward radiation of high frequency energy, receiving means capable of responding to said radiated high frequency energy which is returned from the surface of the earth, a source of a periodic gating signal, means responsive to said gating signal for activating said transmitting and receiving means respectively during alternating time intervals, and means sensitive to the system altitude for controlling the period of said gating signal whereby the latter period is increased or decreased in response to a predetermined increase or decrease respectively in the altitude sensed.

10. A pulsed airborne Doppler radar system comprising, transmitting means capable of earthward radiation of high frequency energy, receiving means capable of responding to said radiated high frequency energy which is returned from the earth, said receiving means utilizing a fixed frequency signal from a source thereof, a source of a gating signal of frequency which is a selected subharmonic of said fixed frequency, means responsive to said gating signal for activating said transmitting and receiving means respectively during alternating substantially equal time intervals, and means sensitive to the system altitude for selecting said subharmonic.

11. A pulsed airborne Doppler radar system comprising, transmitting means capable of earthward radiation of high frequency energy, receiving means capable of responding to said radiated high frequency energy which is returned from the earth, said receiving means utilizing a fixed frequency signal from a source thereof, a source of a gating signal of frequency which is a selected subharmonic of said fixed frequency, means responsive to said gating signal for activating said transmitting and receiving means respectively during alternating substantially equal time intervals, and means responsive to an altimeter for changing the order of said subharmonic in response to predetermined change in the indicated altitude.

12. A pulsed airborne Doppler radar system comprising, transmitting means capable of earthward radiation of high frequency energy, receiving means capable of responding to said radiated high frequency energy which is reflected, said receiving means utilizing a fixed frequency signal from a source thereof, a source of gating signals which comprises a multi-stage counter chain energized by said fixed frequency signal, associated with each counter stage a gate having a first input energized by its associated counter stage and a second input which may be selectively activated, an altimeter, means responsive to the altimeter indication for activating one of said gates, buffer means for coupling the output signal from the activated gate to a gating flip-flop which responds to the latter with oppositely phased square-wave gating signals each of frequency which is a subharmonic of said fixed frequency selected in accordance with the altimeter activated gate whereby indication of the next higher altitude range effects the selection of the next lower frequency subharmonic.

13. A pulsed airborne Doppler radar system comprising, transmitting means capable of earthward radiation of high frequency energy, receiving means capable of responding to said radiated high frequency energy which is returned from the surface of the earth, gating means for activating said transmitting and receiving means during alternating time intervals of equal duration, and altitude sensing means for causing said gating means to activate said transmitting and receiving means at a rate inversely proportional to the altitude of said system.

14. A pulsed airborne Doppler radar system in accordance with claim 13 wherein said altitude sensing means is arranged to vary said rate in predetermined steps in response to respective stepwise variations in the altitude of said system.

15. A pulsed radar system comprising, transmitting means capable of illuminating a surface with high frequency energy, receiving means capable of responding to the radiated high frequency energy which is returned from said surface, a source of a periodic gating signal, means responsive to said gating signal for activating said transmitting and receiving means respectively during alternating time intervals, and distance sensing means responsive to the distance between the transmitting and receiving means and said surface for controlling the period of said gating signal whereby the latter period is increased or decreased stepwise in response to a predetermined stepwise increase or decrease respectively in the distance sensed.

16. A pulsed radar system comprising, transmitting means capable of illuminating a surface with high frequency energy, receiving means capable of responding to said radiated high frequency energy which is returned from said surface, a source of a periodic gating signal, means responsive to said gating signal for activating said transmitting and receiving means respectively during alternating time intervals, and distance sensing means responsive to the distance between the transmitting and receiving means and said surface for controlling the period of said gating signal whereby the latter period is increased or decreased in response to a predetermined increase or decrease respectively in the distance sensed.

17. An airborne pulsed radar system comprising, a source of a constant high frequency signal, transmitting means for radiating said signal during alternate ones of equal time intervals, gating means for controlling the duration of said intervals, a signal receiver, said gating means causing said receiver to be responsive to reflections of the radiated signal only during the non-radiating intervals of said transmitting means, and altitude sensing means governing the duration of said intervals so that said transmitting means ceases to radiate just prior to the reception of the front of the reflected signal.

References Cited in the file of this patent

UNITED STATES PATENTS

| | | |
|---|---|---|
| 2,400,309 | Kock | May 14, 1946 |
| 2,485,583 | Ginzton | Oct. 25, 1949 |
| 2,738,502 | Armstrong | Mar. 13, 1956 |